United States Patent
Aili et al.

(10) Patent No.: US 11,531,905 B2
(45) Date of Patent: Dec. 20, 2022

(54) NETWORK OF KNOWLEDGE USING A COMMON COMMUNICATION PROTOCOL

(71) Applicant: Artificial Solutions Iberia SL, Barcelona (ES)

(72) Inventors: Eric Aili, Huddinge (SE); Ramazan Gurbuz, Uppsala (SE); Anna Hjalmarsson, Skarpnäck (SE); Andreas Wieweg, Hägersten (SE)

(73) Assignee: ARTIFICIAL SOLUTIONS IBERIA S.L., Barcelona (ES)

( * ) Notice: Subject to any disclaimer, the term of this patent is extended or adjusted under 35 U.S.C. 154(b) by 0 days.

(21) Appl. No.: 16/930,700

(22) Filed: Jul. 16, 2020

(65) Prior Publication Data

US 2022/0019904 A1    Jan. 20, 2022

(51) Int. Cl.
*G06N 5/02* (2006.01)
*G06F 40/30* (2020.01)
*G06N 5/04* (2006.01)

(52) U.S. Cl.
CPC .............. *G06N 5/02* (2013.01); *G06F 40/30* (2020.01); *G06N 5/043* (2013.01)

(58) Field of Classification Search
CPC ........... G06N 5/02; G06N 5/043; G06F 40/30
See application file for complete search history.

(56) References Cited

U.S. PATENT DOCUMENTS

| | | | |
|---|---|---|---|
| 2007/0203996 A1 | 8/2007 | Davitz et al. | |
| 2014/0244712 A1* | 8/2014 | Walters | G06Q 10/10 709/202 |
| 2015/0199613 A1 | 7/2015 | Ruiz et al. | |
| 2016/0203412 A1 | 7/2016 | Merdivan et al. | |
| 2017/0358302 A1* | 12/2017 | Orr | G06F 16/433 |
| 2018/0293484 A1* | 10/2018 | Wang | G06F 3/167 |
| 2019/0058793 A1* | 2/2019 | Konig | H04M 3/5183 |

* cited by examiner

*Primary Examiner* — Kevin W Figueroa
(74) *Attorney, Agent, or Firm* — Galvin Patent Law LLC; Brian R. Galvin; Brian S. Boon

(57) ABSTRACT

A network of knowledge that combines different AI bots using a common communication NOK protocol, using a designated bot as a gateway through which all queries are passed while using the NOK protocol is used to draw information and capabilities from member bots transparently to the user. Eagerness scores are derived for each member and each query, indicating a given bot's ability to respond well to the query, and eagerness may be used to provide recommendations to the gateway for a specific member to handle a given query.

12 Claims, 13 Drawing Sheets

NETWORK OF KNOWLEDGE USING A
COMMON COMMUNICATION PROTOCOL

CROSS-REFERENCE TO RELATED
APPLICATIONS

None.

BACKGROUND

Field of the Art

The disclosure relates to the field of computer operations, and more particularly to the field of using AI bots to respond to user queries.

Discussion of the State of the Art

In enterprise operations, AI assistants or "bots" are frequently used to enhance aspects of the customer experience as well as to assist employees with internal operations such as helpdesk lookups, account operations, and other tasks. Consumer-facing bots are commonplace, such as search engines and interactive customer service chat bots that may assist a user with basic troubleshooting or other issues, while transferring more complex issues to a human agent for handling.

When multiple bots are used for different purposes, a user may have difficulty locating the best bot for assistance, or may not even know how to determine which bot is most-suitable for resolving their specific issue. Enterprises may operate a number of bots with different roles that may have been designed at different times and may utilize different architectures and platforms, and when a business acquisition occurs they may be faced with the problematic choice between spending resources maintaining new bots and training staff in their operation, or developing new bots to replace those acquired.

What is needed, is a system for unifying bots and other enterprise resources into a single network of knowledge, so information and capabilities may be pooled and interconnected to best serve user queries and take advantage of each resource's specific capabilities, while solving the problems associated with having multiple different and incompatible bots and allowing for rapid and low-cost integration of any new bots or resources into the network.

SUMMARY

Accordingly, the inventor has conceived and reduced to practice, a system and method for a network of knowledge using a common communication protocol, that enables bots of various different architectures and capabilities to be rapidly integrated into the network and to communicate with each other through a common communication protocol, sharing their resources and abilities to form a unified network that can respond to user queries in an optimal fashion.

According to one aspect, a system for a network of knowledge using a common communication protocol, comprising: a NOK gateway comprising at least a processor, a memory, and a plurality of programming instructions stored in the memory and operating on the processor, wherein the programming instructions, when operating on the processor, cause the processor to: receive an utterance from a user during a user interaction; store interaction data based on the content of the user interaction; receive a plurality of eagerness values from a plurality of members using a common communication protocol, wherein each of the plurality of members comprises an AI bot configured to use the common communication protocol; retrieve stored member information and stored interaction data using the common communication protocol; analyze at least a portion of the plurality of eagerness values to produce a weighted score for each analyzed eagerness value, the weighted score being based at least in part on the retrieved stored member information; create a member stack comprising a ranked list of each of the plurality of members, wherein each member's rank is determined according to the weighted score produced for the member's respective eagerness value; select a member from the member stack; transmit the utterance to the member using the common communication protocol; receive a response from the member using the common communication protocol; and provide the response to the user, is disclosed.

According to another aspect, a method for a network of knowledge using a common communication protocol, comprising the steps of: receiving, at a NOK gateway, an utterance from a user during a user interaction; storing interaction data based on the content of the user interaction; receiving a plurality of eagerness values from a plurality of members using a common communication protocol, wherein each of the plurality of members comprises an AI bot configured to use the common communication protocol; retrieving stored member information and stored interaction data using the common communication protocol; analyzing at least a portion of the plurality of eagerness values to produce a weighted score for each analyzed eagerness value, the weighted score being based at least in part on the retrieved stored member information; creating a member stack comprising a ranked list of each of the plurality of members, wherein each member's rank is determined according to the weighted score produced for the member's respective eagerness value; selecting a member from the member stack; transmitting the utterance to the member using the common communication protocol; receiving a response from the member using the common communication protocol; and providing the response to the user, is disclosed.

BRIEF DESCRIPTION OF THE DRAWING
FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
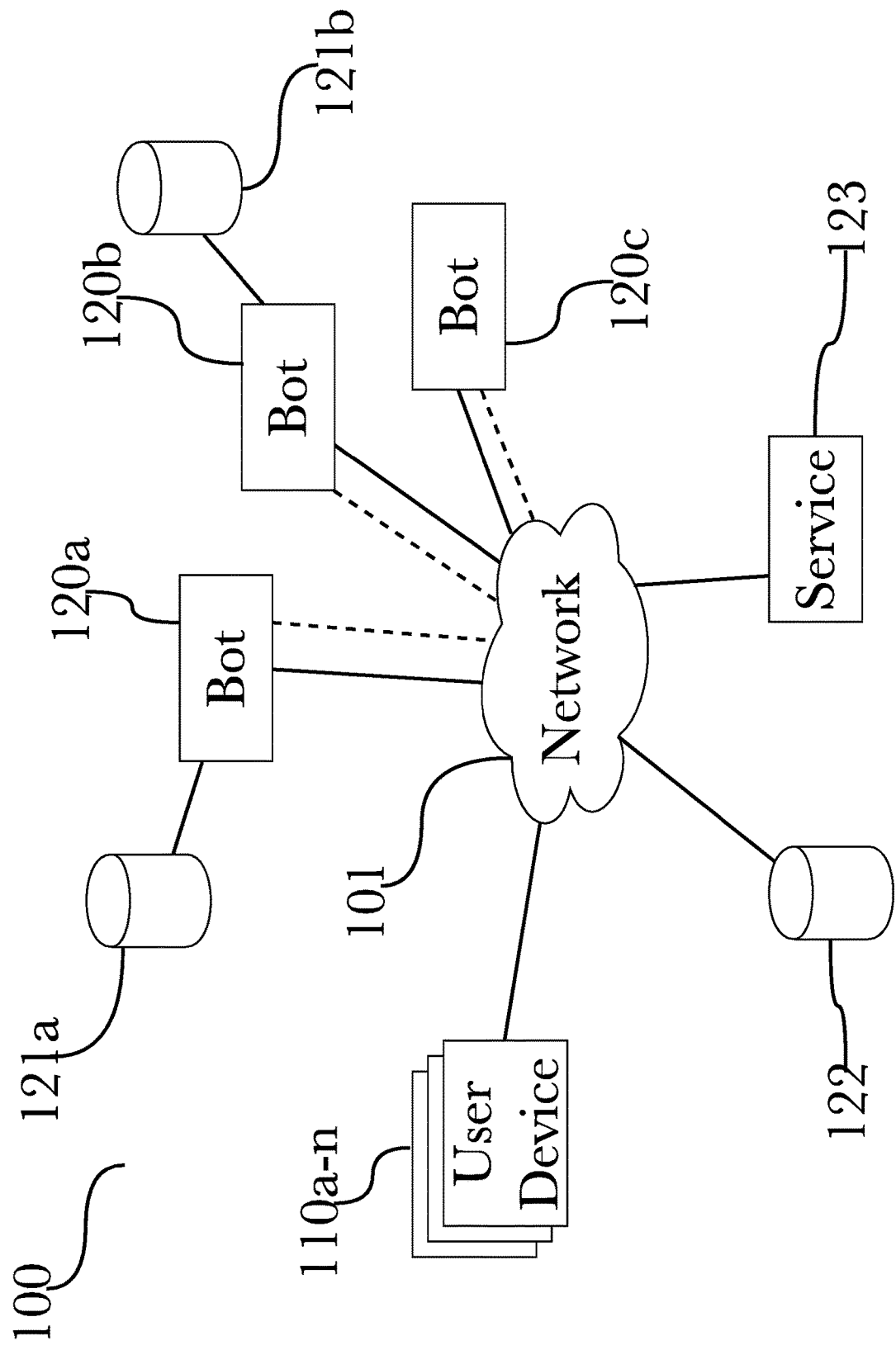
FIG. 1 is a block diagram illustrating an exemplary system architecture for a network of knowledge, according to one aspect.

The inventor has conceived, and reduced to practice, a system and method for a network of knowledge using a common communication protocol, that enables bots of various different architectures and capabilities to be rapidly integrated into the network and to communicate with each other through a common communication protocol, sharing their resources and abilities to form a unified network that can respond to user queries in an optimal fashion.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

"Bot" refers to any form of electronic query-response component, which may comprise artificial intelligence or machine learning behavior, and may communicate with other components as well as with a user device.

"Network of knowledge", also referred to herein as NOK, refers to a network of multiple bots and other resources that may communicate using a common protocol to pool information and respond to queries, as well as to forward queries between bots and resources for optimal handling.

"Gateway" refers to a bot or other resource that operates as the first point of contact for a user interaction, and communicates with other resources within a NOK to either respond to the user's utterances or forward them to an appropriate resource for handling.

"Member" refers to a bot or other resource that operate within a NOK and communicates with a gateway, may provide information to the gateway, and may respond directly to forwarded queries.

"NOK protocol" refers to a common communication protocol for transmitting queries and other information between a gateway and members of a NOK, and provides a standardized messaging framework for communication between bots and resources of various architectures in order to pool their information and capabilities to optimally handle queries submitted to the NOK. Specific functions provided by a NOK protocol may be enabled or disabled by an enterprise, and the modified NOK protocol may be provided for use by all connected bots and resources within that enterprise's NOK.

"User" refers to any human that may interact with a NOK, and may be a member of an enterprise operating a NOK, or a customer thereof, or any other human with the means to communicate with a NOK (for example, by accessing a web interface on their personal device such as a smartphone or personal computer).

"Resource", as used herein, refers to any information, database, software application, hardware interface or component, application programming interface (API), third-party service, or any other physical or virtual resource that may be available to or accessible by a gateway or member. Resources may be used by a member or gateway to provide information and functionality as needed, such as by retrieving stored information or offering specific functions that are made possible by the resource.

Conceptual Architecture

FIG. 1 is a block diagram illustrating an exemplary system architecture 100 for a network of knowledge, according to a preferred embodiment of the invention. According to the embodiment, a plurality of bots 120a-c may be connected to a network 101 such as the Internet or a local area network (LAN) such as a corporate intranet. Via this network connection, bots may receive queries from user devices 110a-n such as (for example, including but not limited to) a user's smartphone or tablet computing device, a personal computer such as a laptop, a public computer or terminal, an employee workstation, or an administrative interface operated by an organization. In responding to a user utterance, a bot may retrieve and provide information from a local datastore 121a, 121b connected to the bot (for example, a database operating within an enterprise for use by an on-premises bot), and in some embodiments a bot 120c may also retrieve information from a remote database 122 or provide expanded functionality through integration with, or access to, a third-party server 123 such as a cloud-based application or service provider. For example, a helpdesk bot may be able to utilize information in a local database while also retrieving information available from external resources such as online articles or discussion boards that may be relevant to the user interaction.

According to the embodiment, bots 120a-c may communicate with one another using a NOK protocol, as illustrated using dashed lines. This common protocol may be used to enable a bot to request information from, or provide information to, another bot regardless of limiting factors such as architecture, location, or operator. This enables a bot 120a to receive an utterance from a user device 110a-n, retrieve any applicable local information 121a, and then consult with additional bots 120b, 120c that may in turn respond with their own local 121b or retrieved external 122 information or provide their own unique capabilities such as those provided by, or drawn from, integrated services 123. This enables an enterprise to deploy a NOK in the form of a compatibility layer, unifying bots and resources into a single pool at minimal cost to make all the available knowledge and capabilities available to employees and customers. By designating an existing, familiar bot as the NOK gateway 210 (described below, with reference to FIG. 2), familiarity and efficiency are maintained while functionality may be expanded as new bots and resources are transparently added to the NOK over time.

Figure 2:
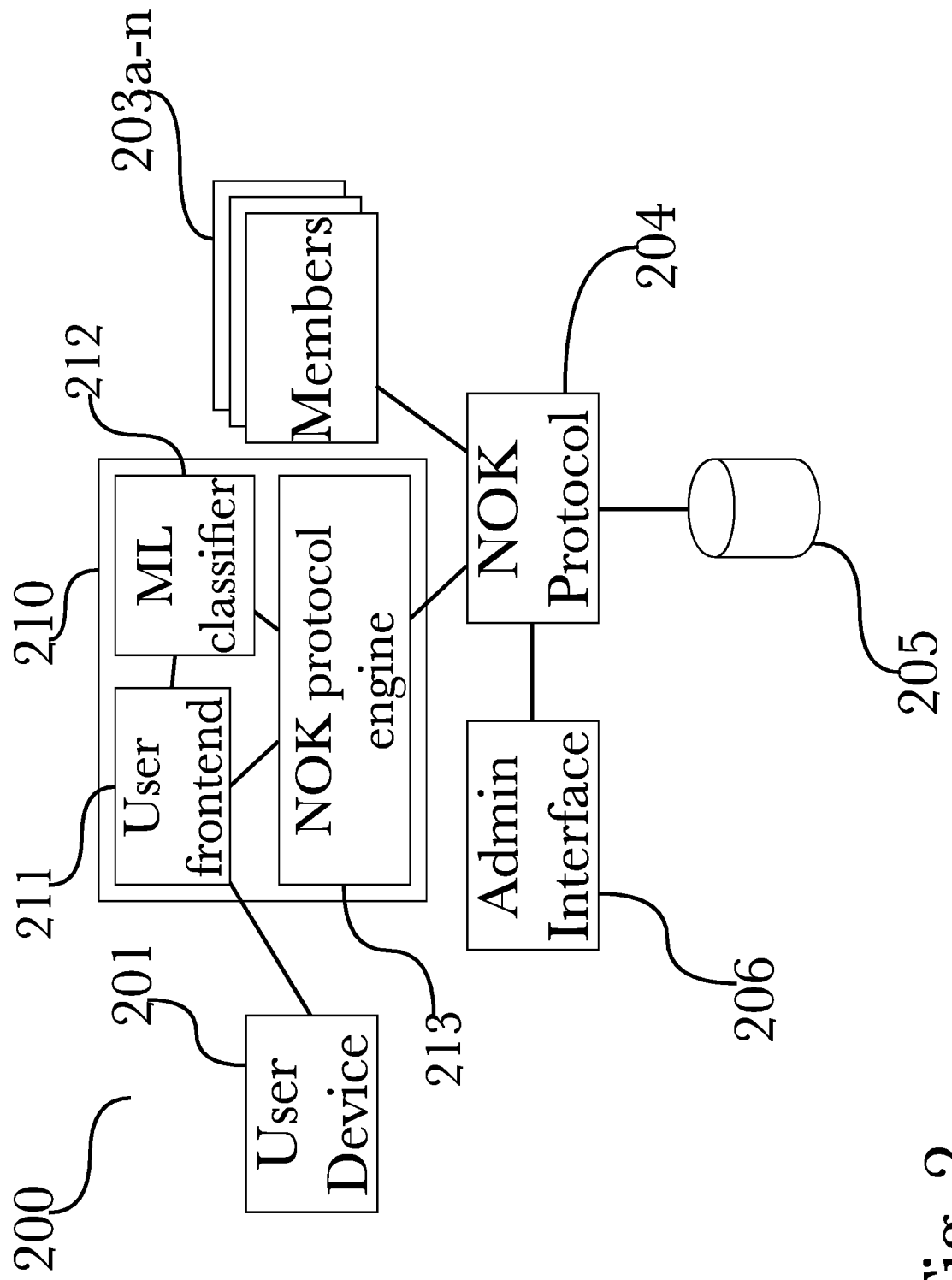
FIG. 2 is a block diagram illustrating an exemplary logical architecture for a network of knowledge, according to one aspect.

FIG. 2 is a block diagram illustrating an exemplary logical architecture for a network of knowledge 200, according to one aspect. According to the aspect, a user 201 may interact with a gateway 210 which may be operated by an enterprise. The user may interact directly, such as communicating directly with a designated gateway 210 via a web-based chat interface, or they may be directed to gateway 210 by another bot or service. For example, a user may be utilizing a self-service assistance bot to manage their account via a website, and if the bot determines that it is unable to help further it may forward the user's conversation to a gateway 210 for handling by a NOK 200 operated by the enterprise. Gateway 210 may further comprise a user frontend 211 that provides interactive means for users to communicate with the gateway 210 (for example, a web-based chat interface or a software application specifically for interacting with the gateway 210), a machine learning (ML) classifier 212 that applies machine learning techniques to NOK information such as member eagerness scores and historical user interactions, and a NOK protocol engine 213 that implement a NOK protocol 204 to communicate with member bots 203a-n as well as store 205 NOK information in a consistent manner for future use, such as historical user interactions and available resources accessible to members 203a-n within the NOK.

Gateway 210 may have knowledge of member bots 203a-n within a NOK, and may communicate using a NOK protocol 204 to select and request information or assistance from various members 203a-n. For example, gateway 210 may detect a user's language and select members that use the detected language, or gateway 210 may detect a user's location or account information if they are currently signed in to an account visible to gateway 210, or receive user information via form submission such as when the user begins a conversation. Any received or retrieved user information such as (for example, including but not limited to) language preference, location, age, sex, demographic information, account preferences, or historical interactions with members, may be used to determine relevant or desirable members with which to communicate.

Gateway 210 operates as a frontend for user queries, receiving a query and determining the best response to provide based not only on the gateway's own resources and abilities, but also those of each known member 203a-n. NOK protocol 204 may provide compatibility functionality to facilitate communication between gateway 210 and members 203a-n as well as a standardized protocol for receiving and combining information from members 203a-n to store (for example, in a database 205 for storing and providing information pertaining to the NOK and its members) and provide information about members, recommendations, and statistics such as network utilization or resource optimization data. NOK protocol 204 may also be used to access stored query and member information to derive additional statistics such as (for example) an "eagerness" metric that describes a given member's "desire" to respond to a given utterance.

A member's eagerness score may be based on that particular bot's capabilities and accessible resources, their relevance to a given utterance, and also known historical results from prior interactions stored in database 205. For example, a user may provide feedback about the manner in which their interaction was handled, which may be stored and later used to determine whether the members or resources used, or the solutions provided, were indeed relevant or useful. In this manner it can be appreciated that a member does not necessarily have a single eagerness score, but rather a score that is derived for each received utterance based on what is known about the member (such as their specific capabilities and available resources), the user (such as their past queries and how various solutions and resources were received), and the NOK as a whole. For example, a member designed to handle financial transactions for a user may be less eager to respond to a technical issue than a member designed to assist with technical support. In this manner, each member may be given an eagerness score for each received utterance based on the member's available resources, information, and capabilities. This allows member recommendations (both recommendations from a member, such as information or resources to be provided to a user, and recommendations for a member, to direct gateway 210 to the best member for assisting with a particular interaction) to be provided to the gateway 210 so that the user's utterance may be handled in the most efficient manner, by utilizing the most-appropriate resources and requesting information or forwarding the utterance to the most-capable member for assistance.

Operation of NOK protocol 204 may be modified through the use of an administrator interface 206, which enables enterprise users to manage the core functionality of the NOK and its components. Individual bots may be added or removed, network utilization may be managed to prevent delays and optimize resource allocation, routing decisions may be modified to ensure queries are delivered appropriately, and modifications may be made directly to stored NOK data and protocol information in database 205. For example, an enterprise may choose not to implement certain NOK protocol functions (such as functions that are not implemented in any of their member bots, and thus would only create additional resource overhead), so they may be disabled by an administrator via admin interface 206 and the modified on-premises instance of the NOK protocol stored in database 205. Members 203a-n may be added as needed, such as to incorporate newly-created or acquired bots, or they may be removed such as to retire deprecated bots or take them offline for modification; for example, if a bot is scheduled to be updated it may be taken offline in advance so the update will not impact live interaction response operations, and then re-added to the NOK after the update is completed.

Detailed Description of Exemplary Aspects

Figure 3:
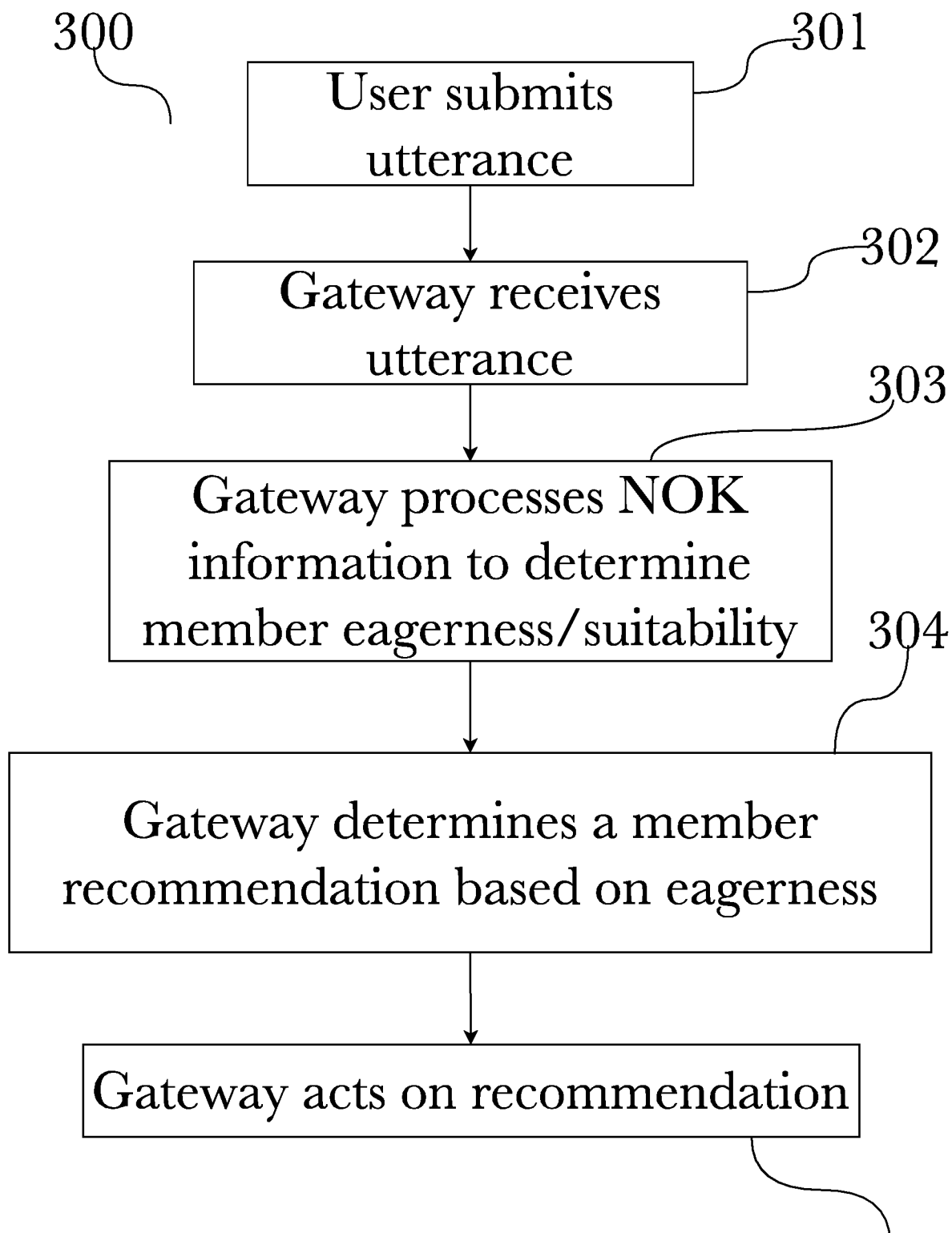
FIG. 3 is a flow diagram illustrating an exemplary method for operating a network of knowledge, according to one aspect.

FIG. 3 is a flow diagram illustrating an exemplary method 300 for operating a network of knowledge, according to one aspect. According to the aspect, a user may submit an utterance 301 such as by asking a question in a chat bot window (for example, embedded in a company's website or a software application running on the user's device) or by providing a search query to a NOK-enabled search engine. A bot designated as the NOK gateway 210 may then receive the utterance 302, for example either a bot that was expressly designated to be the gateway for all queries or a bot that was selected as a gateway based on the nature of this specific interaction. For example, a web chat interface may ask the user for the general category or nature of their interaction, and a bot may be initially selected to serve as the gateway 210 based on the response. The gateway 210 may then process the utterance and retrieve NOK information 303 such as historical interaction records, known member bots and their various respective capabilities and reported eagerness to assist with the utterance, network statistics, or any other real-time or stored historical data pertaining to or produced by the NOK. Gateway 210 then determines a member recommendation 304 for handling the user's utterance, based on the retrieved NOK information and member eagerness scores. Such a recommendation may include, for example, connecting the user directly to a member that reported the highest eagerness, so a proper response may be provided directly to the user, communicating with the member via the gateway and providing the response(s) to the user within the existing interaction with the gateway, or providing a plurality of additional questions or prompts to obtain additional information from the user to better address the user's needs. The gateway 210 may then act on the recommendation 305, taking any recommended actions (such as prompting for more information, providing self-service resources, requesting a response from a member, or connecting the user directly to a member) and responding to the utterance accordingly.

Figure 4:
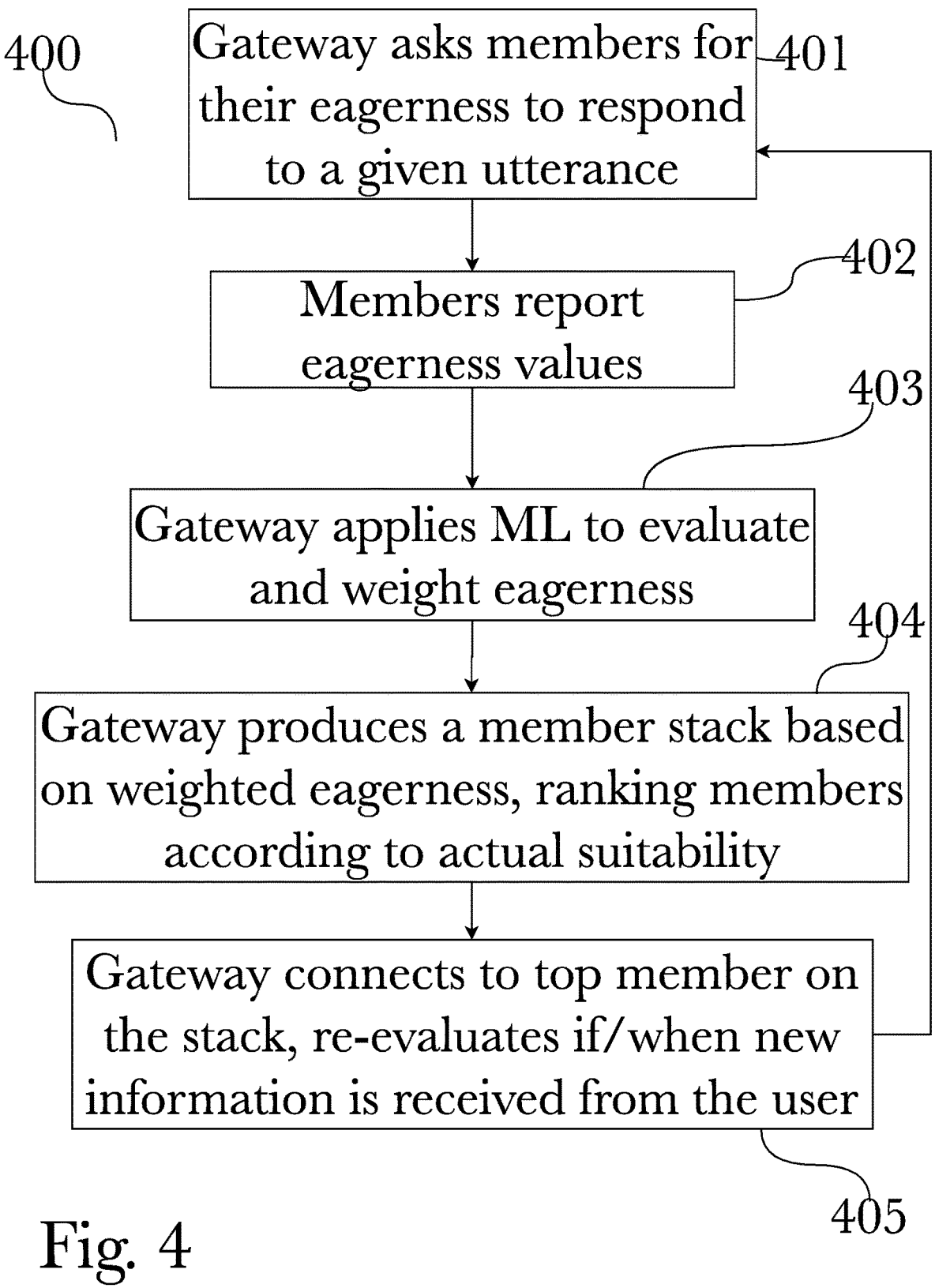
FIG. 4 is a flow diagram illustrating an exemplary method for selecting a member using eagerness, according to one aspect.

FIG. 4 is a flow diagram illustrating an exemplary method 400 for selecting a member using eagerness, according to one aspect. According to the aspect, a gateway 210 may ask members 203a-n of a NOK for their respective eagerness to handle a user's utterance 401. Members 203a-n may report their eagerness values 402, based on how confident a given member bot is that it can appropriately address the utterance. To protect user privacy, an utterance may be anonymized or pseudonymized prior to providing it to members, such as by removing any names, personal details, precise location information, or any other information that may be contained in the text or meta data of an utterance (for example, if the user provided an attached photograph with an utterance, any embedded EXIF or other information tag data may be stripped), or by replacing a name with an automatically-generated pseudonym. Members 203a-n may report eagerness in response to a request from the gateway 210, or they may proactively submit eagerness values once made aware of an utterance; for example, a member may be eager to respond to an utterance but been overlooked by the gateway when selecting members to ask for eagerness, and proactively reporting eagerness ensures the member is still considered. Gateway 210 may then 403 utilize various rules-based (such as applying fuzzy matching or dictionary-based rules) and machine learning (ML) techniques to evaluate and weigh all received eagerness scores. For example, a user's historical interaction records, location, language, or various demographic information or preferences known about the user, may be used to weight member eagerness using word-matching to place a higher emphasis on members that are more relevant to the user, to the present interaction, or to the specific utterance at hand. For example, a user may initially visit a gateway developed in English, but pose a question in Turkish; this may be used to weight Turkish-language members higher as they may be more familiar and approachable to the user by speaking their preferred or native language. Any such received or retrieved (as described above, with reference to FIG. 2) information may be used to assist in member weighting, to ensure that all contextual information is fully utilized. Machine learning for eagerness weighting is described in greater detail below, with reference to FIG. 7. Once eagerness scores have been evaluated and weighted, a member stack is produced 404 that ranks members according to their own reported eagerness as well as the gateway-determined eagerness weighting, ensuring that the most-suitable member, factoring in user history and context, is at the top of the stack and thereby "first in line" to respond. Gateway 210 may then connect to the topmost member in the stack 405, and proceed down the stack as needed (for example, if there is a technical issues with a member preventing communication, or if it turns out that the member cannot fully handle the user utterance). As the interaction proceeds, new information provided by the user may be used to revise the member stack and collect new eagerness scores based on the revised utterance as it is being handled. As an interaction proceeds, gateway 210 may continue to monitor factors such as user sentiment, keyword usage, and other contextual clues, and continue to update the eagerness rankings and member stack and communicate with (or connect the user directly to) new members that may be more-appropriate as the conversation unfolds. In addition, different members may be utilized for different portions of a conversation in order to combine the strengths of multiple individual members in a cooperative fashion. This may be accomplished by the gateway monitoring a conversation and selecting different members from the stack on the fly, based on a secondary eagerness weighting for a portion of the conversation, or a member that is currently assisting a user may recognize the need for a second member to assist and ask the gateway to communicate with the second member and relay the response, or offer to connect the user to the second member to interact directly. A second eagerness weighting may be determined as a conversation continues, recalculating and rearranging a member stack for the present utterance while still retaining the original stack and weighted scores for reference. This may be used to maintain a context-aware member stack that is based on the most-recent utterance and all information gained thus far in the conversation, ensuring that at any point the most-relevant or most-helpful members are known and available for selection.

Figure 5:
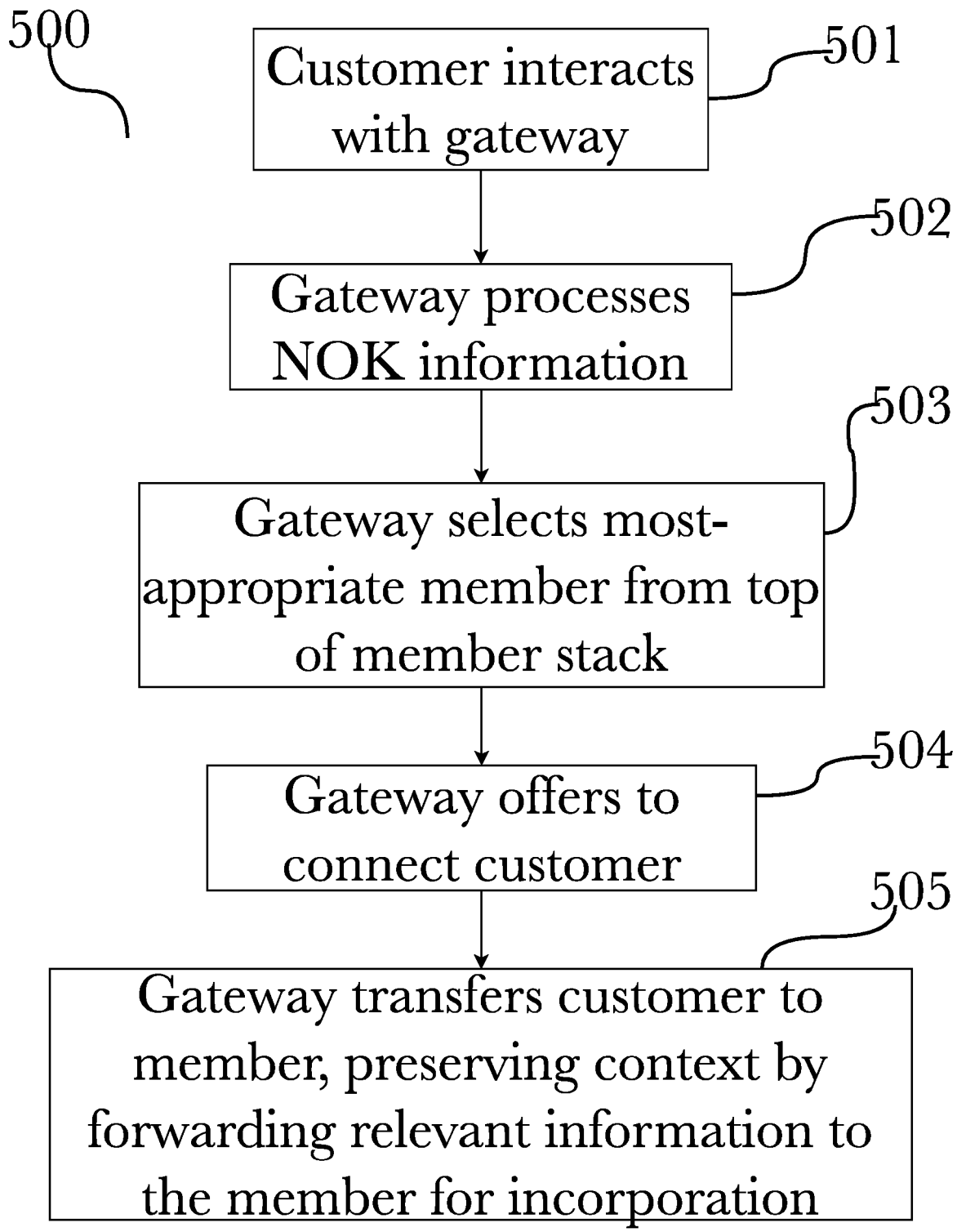
FIG. 5 is a flow diagram illustrating an exemplary use-case for a network of knowledge, wherein an enterprise deploys a NOK to supplement customer service helpdesk operations.

FIG. 5 is a flow diagram illustrating an exemplary use-case 500 for a network of knowledge, wherein an enterprise deploys a NOK to supplement customer service helpdesk operations. Initially, a customer may interact 501 with an enterprise gateway bot 210, such as (for example, including but not limited to) via a web-based chat interface. Gateway 210 may receive an utterance from the user and utilize NOK protocol 204 to asses information within the NOK 502, such as available resources and members 203a-n (as described above, with reference to FIG. 2 and FIG. 4), processing member eagerness and forming a member stack for the utterance. Gateway 210 may then select the most-appropriate member from the top of the member stack 503 that is likely to be able to respond in a way that leads to a positive customer service outcome. Gateway 210 may then offer to connect the customer to the member that can best-assist them 504. If the customer accepts, gateway 210 then transfers the conversation 505 to the selected member, preserving any context such as the conversation history or any questions the customer may have answered or information they may have provided. In this manner, the member selected to handle the interaction is given all available information within the existing conversation, without the need to prompt the user to repeat information that has already been provided or may be readily accessible (such as stored account information).

Figure 6:
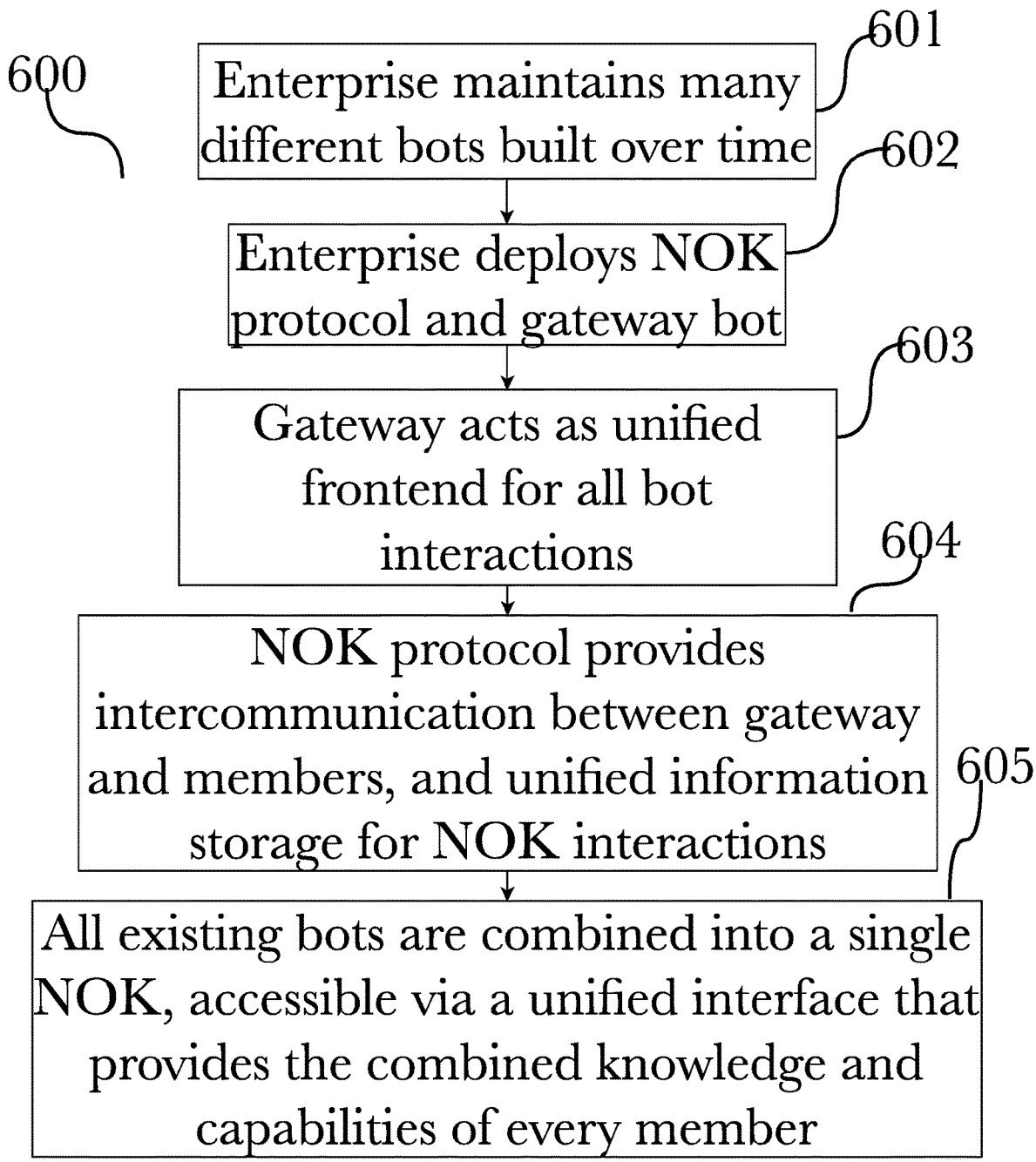
FIG. 6 is a flow diagram illustrating an exemplary use-case for a network of knowledge, wherein an enterprise deploys a NOK to unify a number of existing bots built on different platforms and for different purposes.

FIG. 6 is a flow diagram illustrating an exemplary use-case 600 for a network of knowledge, wherein an enterprise deploys a NOK to unify a number of existing bots built on different platforms and for different purposes. An enterprise may operate a number of bots 601, that may have been set up over a period of time by different departments or for different purposes, some or all of which may have been purchased or acquired. Maintaining familiarity and training for every bot is costly, and time is wasted finding the correct bot for a given query or pursuing an interaction with the wrong bot without realizing, only to have to start over with a different bot. To ameliorate these issues, the enterprise may deploy 602 a NOK protocol 204 and gateway bot 210, such as a new bot designed for the express purpose of operating as a gateway or by adapting an existing bot to fill the role, creating a NOK from their pool of existing bots. This new gateway 210 then operates as a singular, unified interaction frontend for all interactions 603, removing the chance of using the wrong bot to handle a user's request and ensuring familiarity through a consistent interaction experience. NOK protocol 204 provides for intercommunication between all operational resources and bots 604, using the NOK protocol to facilitate standardized communication between all members of the newly-created NOK to ensure all interactions are handled efficiently and all interaction information is stored and served in a consistent manner to aid in future handling. This new NOK combines all existing bots 605 without the need to extensively modify each one individually, providing a unified interface for all queries while taking advantage of the capabilities, information, and resources of each member as appropriate to ensure all queries are handled in an optimal fashion.

Figure 7:
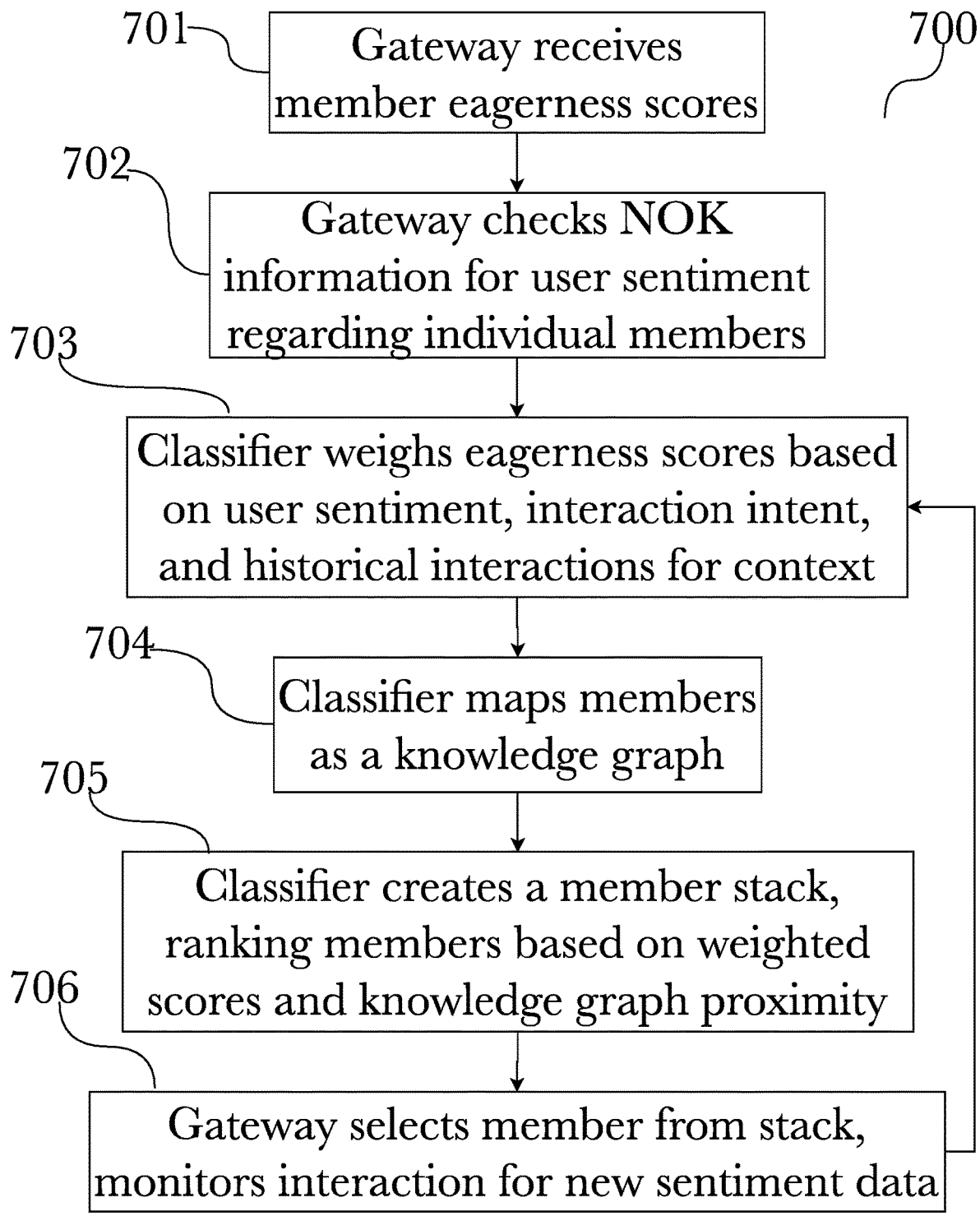
FIG. 7 is a flow diagram illustrating an exemplary ML process for weighting member eagerness and producing a member stack.

FIG. 7 is a flow diagram illustrating an exemplary ML process 700 for weighting member eagerness and producing a member stack. In an initial step 701, gateway 210 receives eagerness scores from a plurality of members 203a-n; such scores may have been requested by the gateway or offered proactively by members, as described above. Gateway 210 then checks stored NOK information 702 to retrieve any known user sentiment regarding individual members, such as (for example) members to which the user may have reacted positively or negatively to varying degrees in the past. Classifier 212 may then weigh each member's eagerness score 703 according to user sentiment for the member, any known intent for the user interaction (for example, if the user has made it clear that they are discussing hotel reservations, whether by explicitly selecting or stating this intent or as may have been revealed by their interaction text, such as mentioning the name of a well-known hotel in conjunction with the desire to make a reservation), and any historical interactions that may be used to lend context to the current interaction being handled.

These weighted eagerness scores may then be used 704 to produce a knowledge graph representing the various members in the NOK, where their weighted eagerness and available resources (such as access to an online reservation handling system) are used to model the members' relevance as proximity to the user's utterance. A member may be highly-eager, yet lack the requisite resources to actually complete a user's request, which may be used by classifier 212 to place that member farther away on the knowledge graph despite an initially-high eagerness. After determining this knowledge graph to gain an overall model of each member's suitability, classifier 212 produces a member stack that hierarchically ranks members according to their final aggregate suitability for the user's utterance 705. Members may be added to, removed from, or rearranged within the member stack as appropriate, for example as the user interaction continues and new information becomes available that may affect the member rankings and proximity in the knowledge graph (whether or not the members themselves see fit to revise their eagerness). In this manner, a member's suitability is based on a combination of both their own self-reported eagerness to respond to a given utterance, and the gateway's broader view of all the available information that may not be available to the member, so that the gateway effectively places each member's eagerness into an appropriate context. Gateway 210 may then select a member from the stack 706, for example the topmost and thus most-appropriate member, or a member selected specifically to determine how the user responds. As the interaction continues, the user's responses may be used to produce new sentiment information for the member with which they are interacting (either directly or indirectly, as may be the case where the gateway communicates with the member and relays their information and responses to the user, and vice-versa), and the new sentiment information may be incorporated into a current ML process to update the member stack, or stored and utilized in future interactions.

Figure 8:
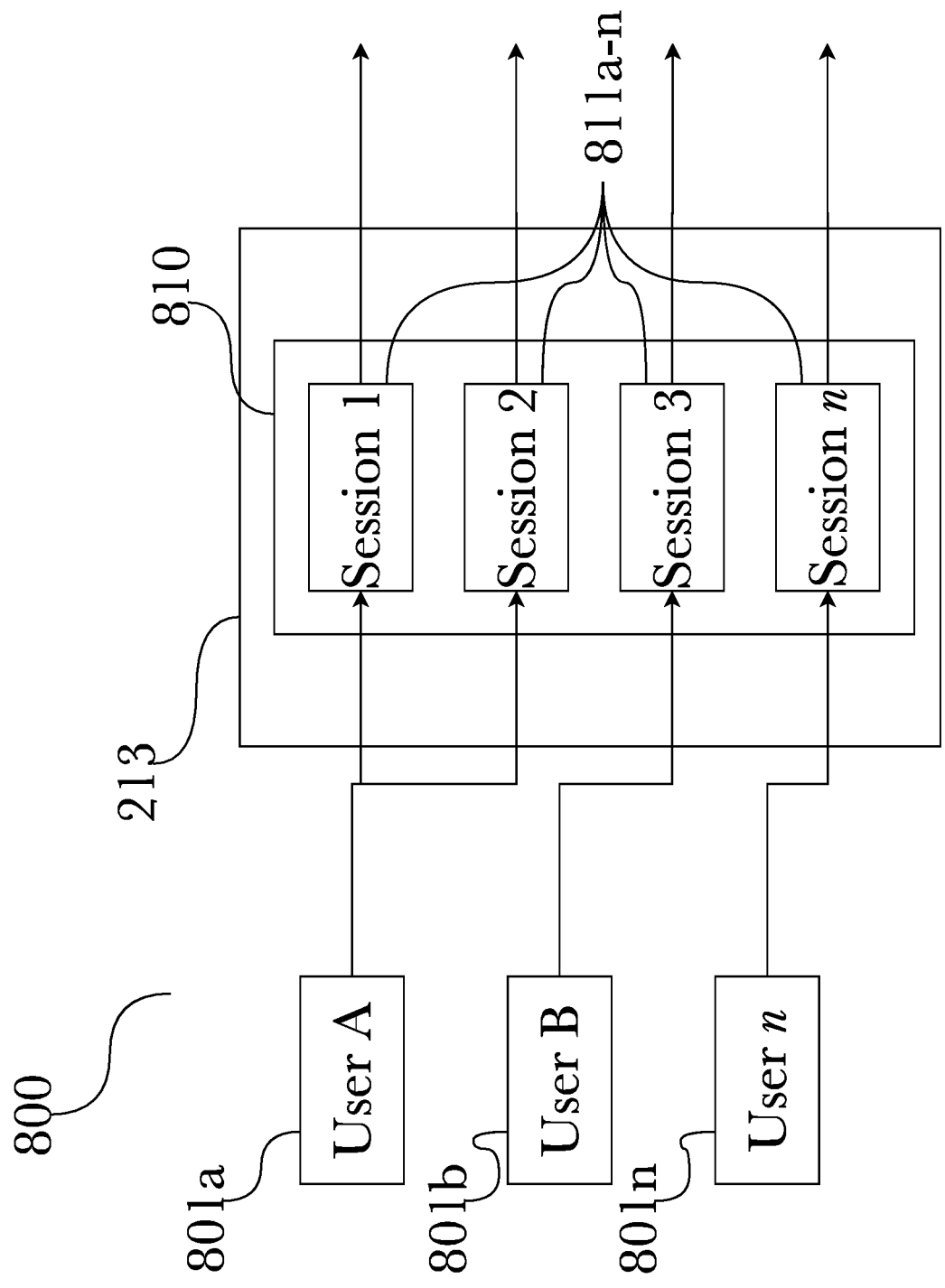
FIG. 8 is a block diagram illustrating the use of a session manager by a NOK protocol engine to manage multiple user interaction sessions.

FIG. 8 is a block diagram 800 illustrating the use of a session manager 810 by a NOK protocol engine 213 to manage multiple user interaction sessions 811*a-n*. A NOK protocol engine 213 may implement a session manager 810 to handle multiple user interaction sessions 811*a-n* simultaneously, enabling a shared NOK protocol (for example, including any modifications made by a system administrator as described previously) to be used for multiple users 801*a-n* and multiple sessions over time within a single NOK system. A user 801*a* may have multiple sessions 811*a-n* as illustrated, which may be multiple separate interactions ongoing at the same time, such as if a user is engaged in multiple activities utilizing the NOK. For example, a user may be managing their customer account while also attempting to book a reservation, which may be separated into two sessions in the session manager 810 so that each respective interaction may involve the best NOK members for assisting the user. Multiple user sessions may also include historical sessions that either were not resolved and terminated (storing any relevant session information such as user sentiment or outcome), or may have be retrieved from storage to resume. For example, a user may indicate that they need technical support with a previous issue, and session manager 810 may retrieve the previous session so that the utterances, responses, members, sentiment, context, or any other session-related factors, may be utilized in handling the current interaction.

Figure 9:
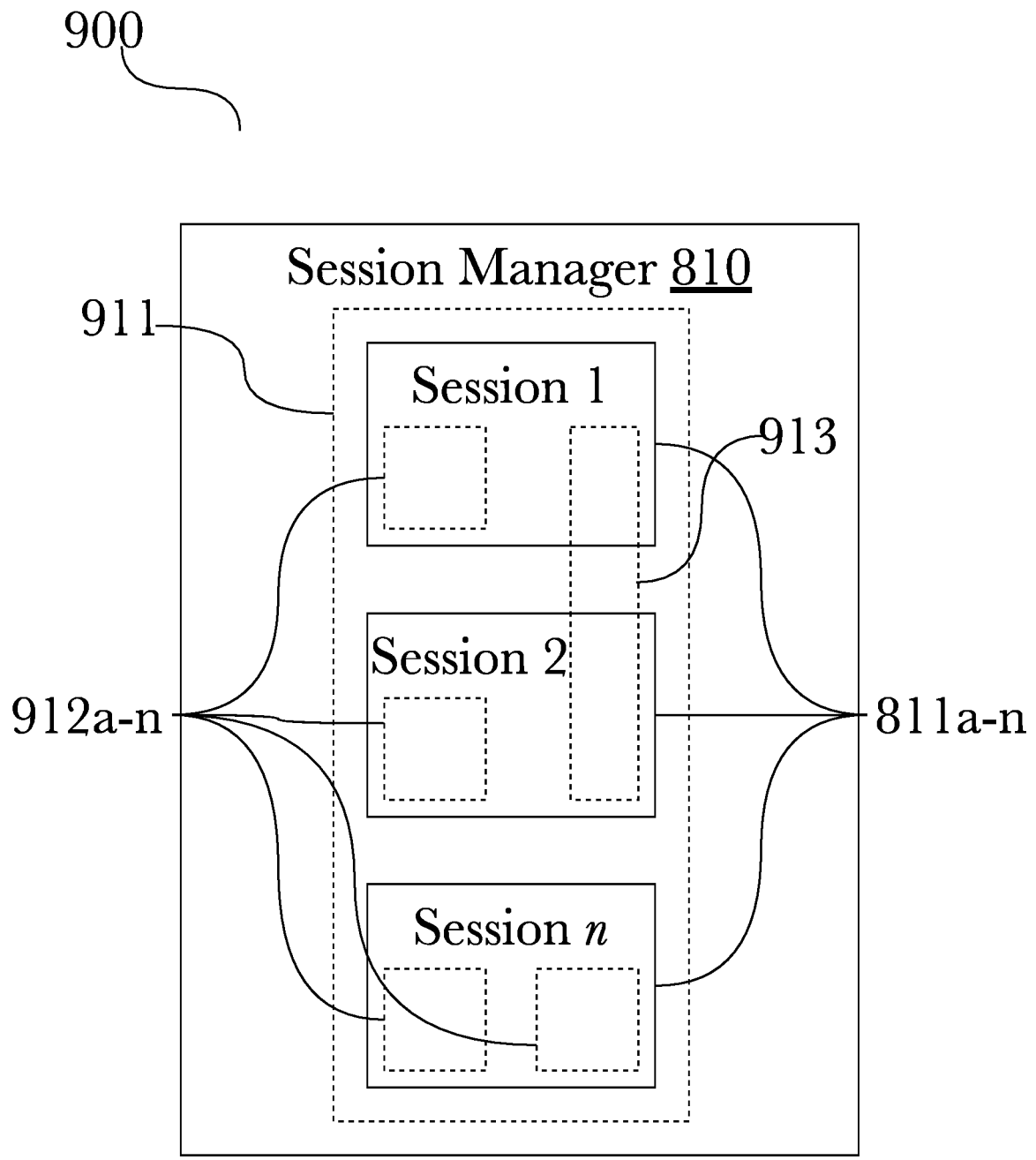
FIG. 9 is a block diagram illustrating the use of variable scope within a session manager.

FIG. 9 is a block diagram 900 illustrating the use of variable scope within a session manager 810. As illustrated, information pertaining to a user interaction may vary in scope, with information being considered relevant or being made accessible according to the determined scope of that information. For example, a number of session-specific variables 912*a-n* may comprise information that only has relevance within a particular session 811*a-n*, such as information pertaining to a specific issue being discussed at the time. Another variable 913 may be relevant across multiple sessions 811*a-n*, such as (for example) a user's calendar schedule, account access for a third-party service (such as a booking service), or user sentiment toward a specific NOK member (which may be considered relevant for any interactions involving the same member). Additionally, some information 911 may be relevant across all interaction sessions 811*a-n*, such as user information (for example, demographic information, language preference, location, or other user-specific information) or system variables such as NOK configuration that is applicable to any/all sessions within the same NOK protocol engine 213. In this manner it can be appreciated that variable scope may be used to ensure not only that relevant information is always available where it is needed, but this approach may also be used to enforce security and privacy policies by ensuring that sensitive information remains within the appropriate context. For example, a user's access information for a particular application or service may be restricted to session-specific scope, requiring them to provide it for each interaction even with the same system because it is prevented from being stored or loaded in a new session.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 10:
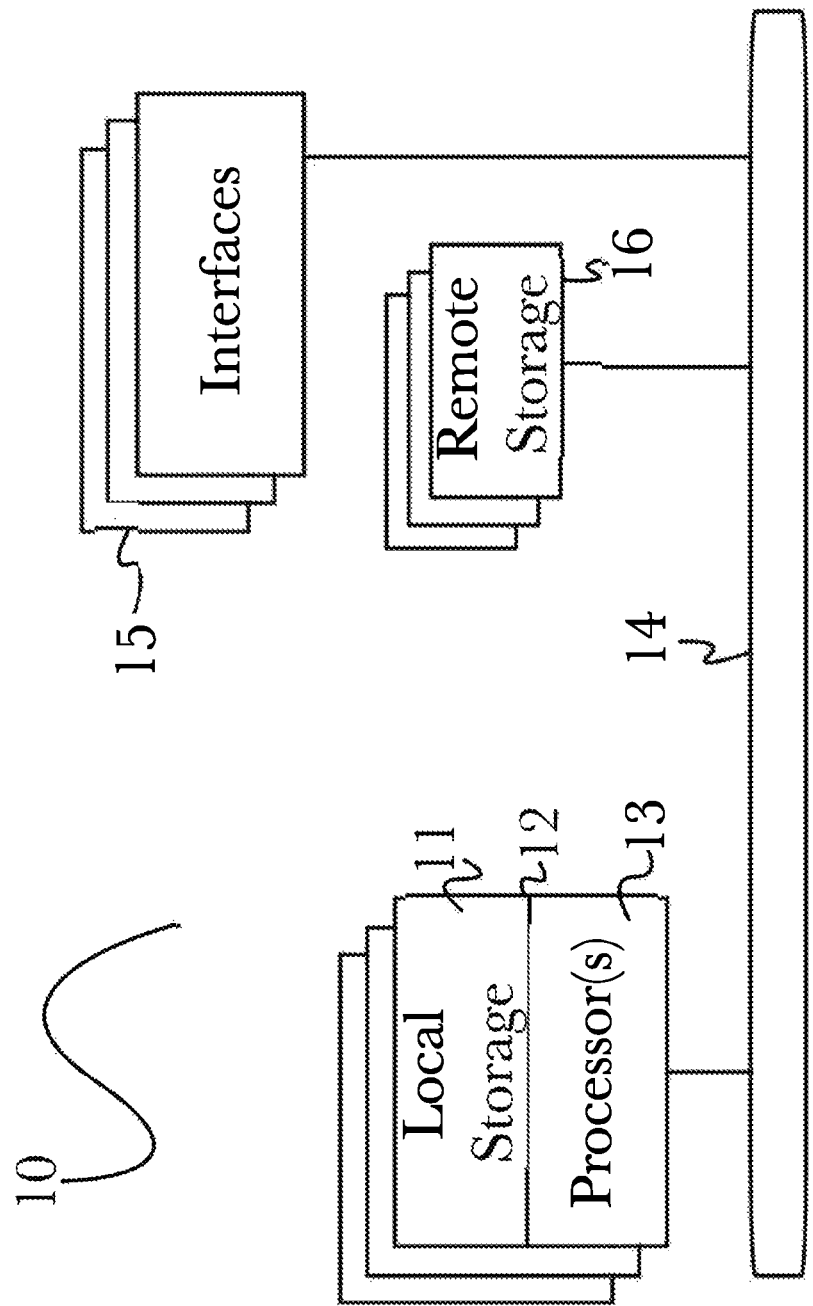
FIG. 10 is a block diagram illustrating an exemplary hardware architecture of a computing device.

Referring now to FIG. 10, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/N hardware interfaces) and, in some instances, volatile and/or non-volatile memory (e.g., RAM).

Although the system shown in FIG. 10 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 11:
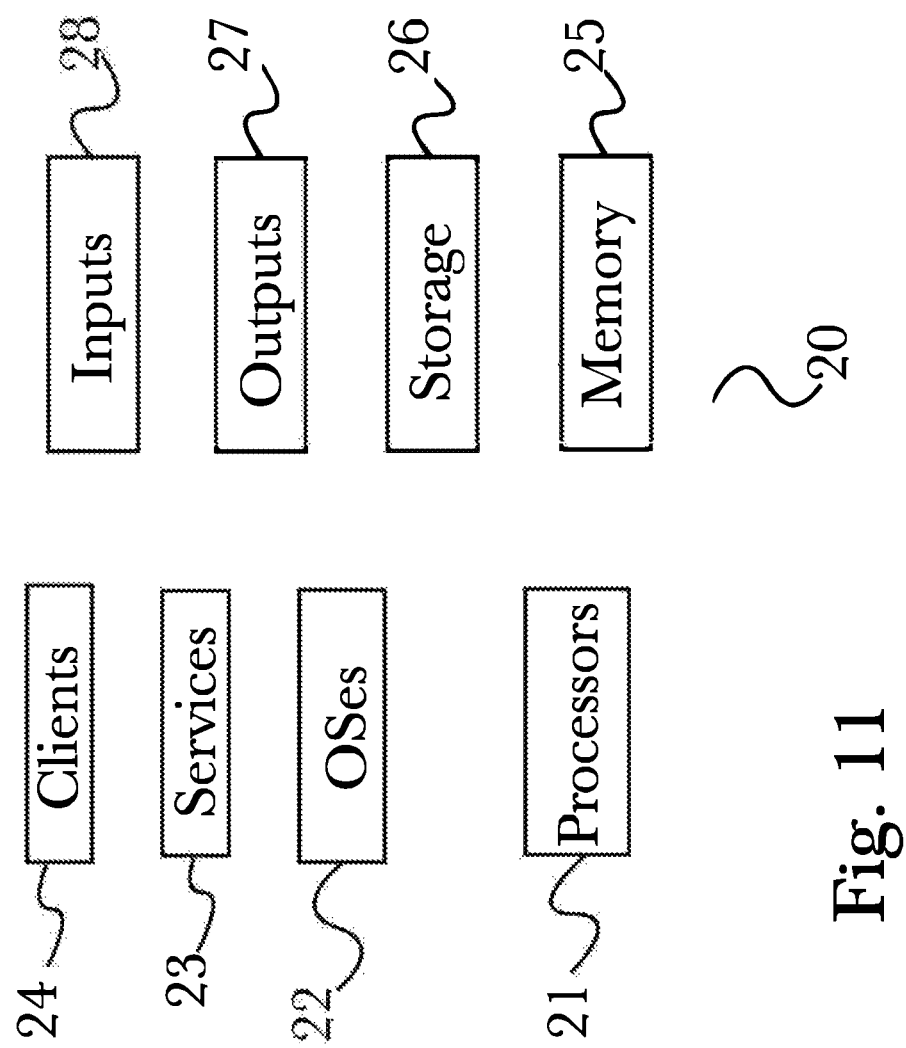
FIG. 11 is a block diagram illustrating an exemplary logical architecture for a client device.

In some aspects, systems may be implemented on a standalone computing system. Referring now to FIG. 11, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 10). Examples of storage devices 26 include flash memory, magnetic hard drive, CD-ROM, and/or the like.

Figure 12:
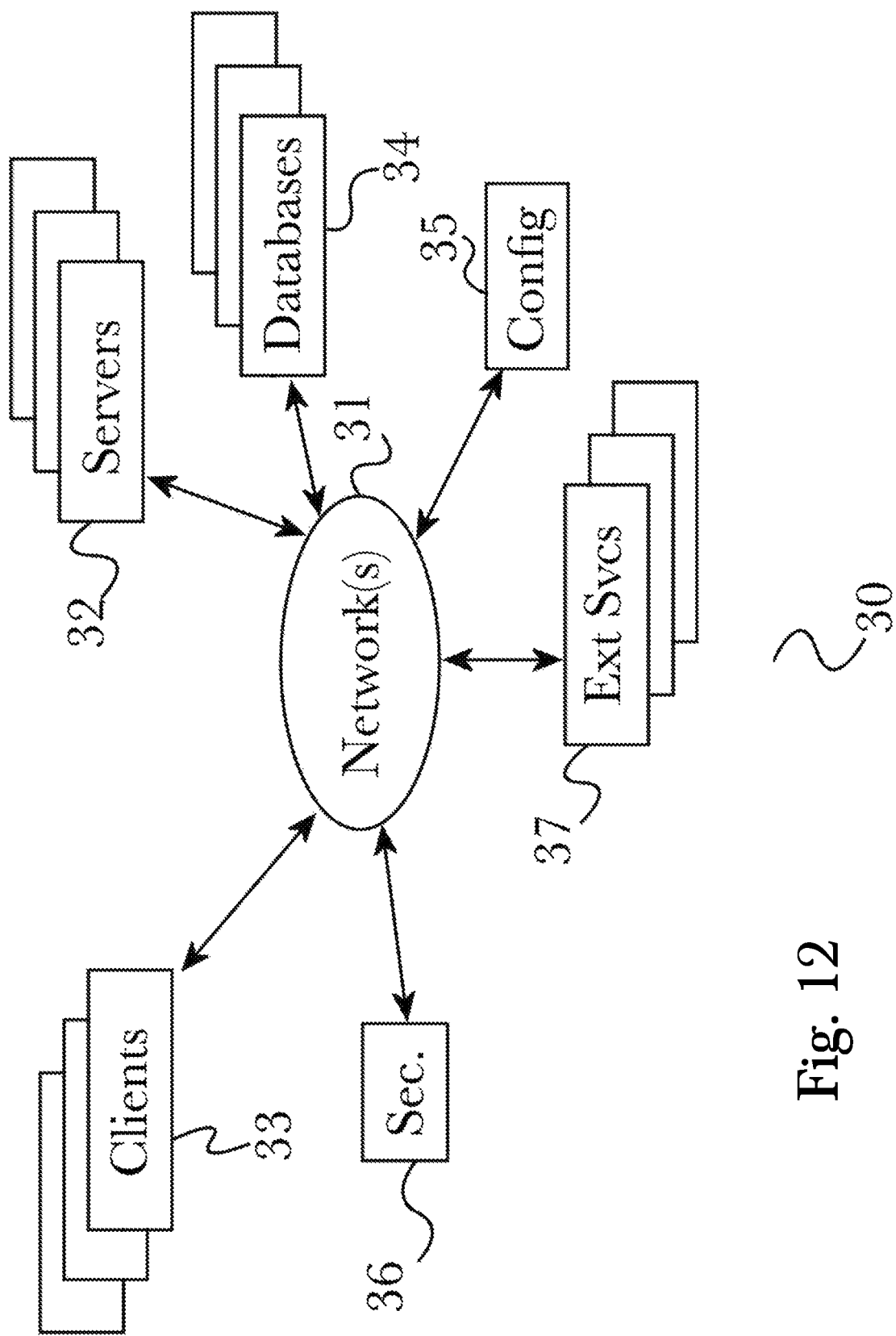
FIG. 12 is a block diagram showing an exemplary architectural arrangement of clients, servers, and external services.

In some aspects, systems may be implemented on a distributed computing network, such as one having any number of clients and/or servers. Referring now to FIG. 12, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 11. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some aspects, clients 33 or servers 32 (or both) may make use of one or more specialized services or appliances that may be deployed locally or remotely across one or more networks 31. For example, one or more databases 34 may be used or referred to by one or more aspects. It should be understood by one having ordinary skill in the art that databases 34 may be arranged in a wide variety of architectures and using a wide variety of data access and manipulation means. For example, in various aspects one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 13:
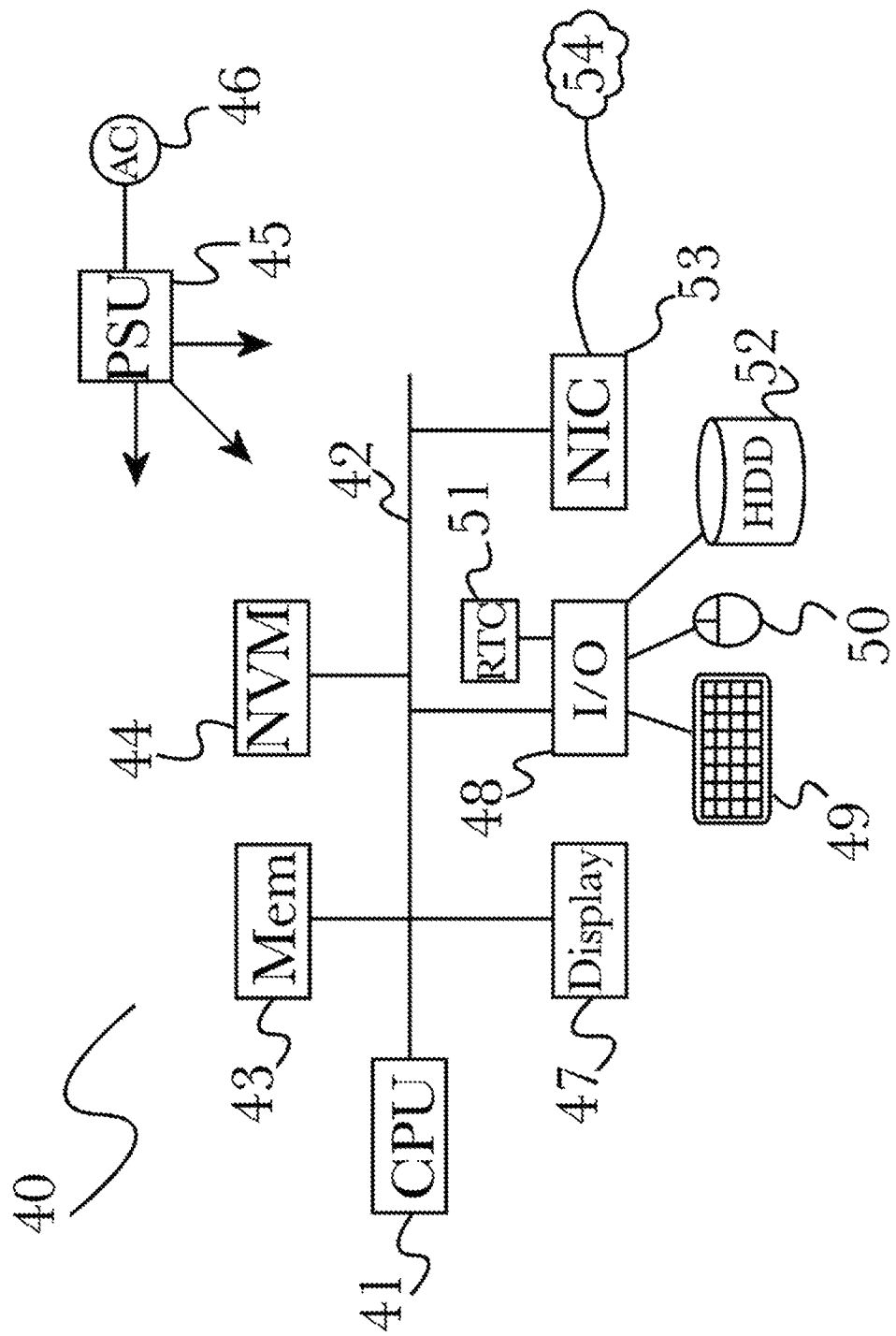
FIG. 13 is another block diagram illustrating an exemplary hardware architecture of a computing device.

FIG. 13 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for a network of knowledge ("NOK") using a common communication protocol, comprising:
   a NOK gateway comprising at least a processor, a memory, and a plurality of programming instructions stored in the memory and operating on the processor, wherein the programming instructions, when operating on the processor, cause the processor to:
   receive a first utterance and a second utterance from a remote user during a user interaction;
   store interaction data based on the content of the user interaction;
   for each of the first and second utterances, compute a plurality of eagerness values for each of a plurality of members using a common communication protocol, wherein each of the plurality of members comprises a remote artificial intelligence ("AI") bot configured to use the common communication protocol;
   retrieve stored member information and stored interaction data for each of the plurality of members;
   analyze at least a portion of the plurality of eagerness values to produce a weighted score for each analyzed eagerness value, the weighted score being based at least in part on the retrieved stored member information;
   create a member stack for the first utterance comprising a ranked list of each of the plurality of members, wherein each member's rank is determined according to the weighted score produced for the member's eagerness value pertaining to the first utterance;
   store a first context for the member stack comprising the ranked list of the member stack associated with the first utterance;
   select a first member from the member stack to respond to the first utterance;
   transmit the first utterance to the first member across a network using the common communication protocol;
   receive a first response from the first member using the common communication protocol;
   provide the first response to the remote user;
   re-rank the members of the member stack for the second utterance, and select a second member to respond to the second utterance;
   store a second context for the member stack comprising the ranked list of the member stack associated with the second utterance;
   transmit the second utterance to the second member across the network using the common communication protocol;
   receive a second response from the first member using the common communication protocol;
   provide the second response to the remote user;
   receive a third utterance from the remote user during the user interaction; and
   re-rank the members of the member stack for the third utterance based at least in part on the first context and second context, and select a third member to respond to the third utterance, wherein the third member may be any member in the member stack;
   transmit the third utterance to the third member across the network using the common communication protocol;
   receive a third response from the third member using the common communication protocol;
   provide the third response to the remote user.

2. The system of claim 1, wherein the NOK gateway is further configured to retrieve a plurality of stored user sentiment data, the stored user sentiment data being based on previous user interactions with members.

3. The system of claim 2, wherein at least one of the weighted scores is further based on retrieved stored user sentiment data.

4. The system of claim 1, wherein the NOK gateway connects the user directly to the member, provides the interaction data to the member, and monitors the user interaction.

5. The system of claim 1, wherein the NOK gateway assigns a scope variable to at least a portion of the interaction data.

6. The system of claim 5, wherein the retrieved stored interaction data is selected based on its respective assigned scope variable.

7. A method for a network of knowledge ("NOK") using a common communication protocol, comprising the steps of:
   receiving, at a NOK gateway, a first utterance and a second utterance from a remote_user during a user interaction;
   storing interaction data based on the content of the user interaction;
   computing, at the NOK gateway, for each of the first and second utterances, a plurality of eagerness values for each of a plurality of members using a common communication protocol, wherein each of the plurality of members comprises a remote artificial intelligence ("AI") bot configured to use the common communication protocol;
   retrieving stored member information and stored interaction data;
   analyzing at least a portion of the plurality of eagerness values to produce a weighted score for each analyzed eagerness value, the weighted score being based at least in part on the retrieved stored member information;

creating a member stack for the first utterance comprising a ranked list of each of the plurality of members, wherein each member's rank is determined according to the weighted score produced for the member's respective eagerness value for the first utterance;
storing a first context for the member stack comprising the ranked list of the member stack associated with the first utterance;
selecting a first member from the member stack to respond to the first utterance;
transmitting the first utterance to the first member across a network using the common communication protocol;
receiving a first response from the first member using the common communication protocol;
providing the first response to the remote user;
re-ranking the members of the member stack for the second utterance, and selecting a second member to respond to the second utterance, wherein each member's rank is determined according to the weighted score produced for the member's respective eagerness value for the second utterance;
storing a second context for the member stack comprising the ranked list of the member stack associated with the second utterance;
transmitting the second utterance to the second member across the network using the common communication protocol;
receiving a second response from the first member using the common communication protocol; and
providing the second response to the remote user;
receiving a third utterance from the remote user during the user interaction; and
re-ranking the members of the member stack for the third utterance based at least in part on the first context and second context, and selecting a third member to respond to the third utterance, wherein the third member may be any member in the member stack;
transmitting the third utterance to the third member across the network using the common communication protocol;
receiving a third response from the third member using the common communication protocol; and
providing the third response to the remote user.

8. The method of claim 7, wherein the NOK gateway is further configured to retrieve a plurality of stored user sentiment data, the stored user sentiment data being based on previous user interactions with members.

9. The method of claim 8, wherein at least one of the weighted scores is further based on retrieved stored user sentiment data.

10. The method of claim 7, wherein the NOK gateway connects the user directly to the member, provides the interaction data to the member, and monitors the user interaction.

11. The method of claim 7, wherein the NOK gateway assigns a scope variable to at least a portion of the interaction data.

12. The method of claim 11, wherein the retrieved stored interaction data is selected based on its respective assigned scope variable.

* * * * *